(12) United States Patent
Xiao et al.

(10) Patent No.: US 8,411,936 B2
(45) Date of Patent: Apr. 2, 2013

(54) APPARATUS AND METHOD FOR COLOR REPRODUCTION

(75) Inventors: Kaida Xiao, Yongin-si (KR); Du-sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1121 days.

(21) Appl. No.: 11/873,014

(22) Filed: Oct. 16, 2007

(65) Prior Publication Data

US 2008/0123944 A1    May 29, 2008

(30) Foreign Application Priority Data

Nov. 23, 2006  (KR) .......................... 10-2006-116566

(51) Int. Cl.
*G06K 9/00* (2006.01)
(52) U.S. Cl. ........ 382/162; 345/603; 348/571; 348/587; 358/1.9
(58) Field of Classification Search .................. 382/162; 345/603; 348/571, 587; 358/1.9
See application file for complete search history.

(56) References Cited

U.S. PATENT DOCUMENTS

| | | | |
|---|---|---|---|
| 6,282,311 B1* | 8/2001 | McCarthy et al. | 382/162 |
| 2004/0183817 A1* | 9/2004 | Kaasila | 345/660 |
| 2006/0119870 A1* | 6/2006 | Ho et al. | 358/1.9 |
| 2006/0126083 A1 | 6/2006 | Kurumisawa et al. | |
| 2006/0165311 A1* | 7/2006 | Watson | 382/286 |
| 2006/0204083 A1* | 9/2006 | Takahashi | 382/162 |
| 2007/0003166 A1* | 1/2007 | Berkner | 382/298 |

FOREIGN PATENT DOCUMENTS

| | | |
|---|---|---|
| EP | 1 667 063 A1 | 6/2006 |
| JP | 8-321960 | 12/1996 |
| JP | 2004-64111 | 2/2004 |
| JP | 2005-311805 | 11/2005 |
| WO | WO 2004/097353 | 11/2004 |

OTHER PUBLICATIONS

"Law of comparative judgement", downloaded from http://en.wikipedia.org/wiki/Law_of_comparative_judgement on Oct. 17, 2007.
Mahdi Nezamabadi et al., "Effect of image size on the color appearance of image reproductions using colorimetrically calibrated LCD and DLP displays", Journal of the Society for Information Display, Society for Information Display, Playa Del Rey, California, vol. 14, No. 9, Sep. 1, 2006.
Paula J. Alessi et al., "A Colour Appearance Model for Colour Management Systems: CIECAMO2", Technical Report, CIE, Jan. 1, 2004, pp. 1-15.
European Search Report dated Oct. 7, 2010 in corresponding European Patent Application 07120881.3.
"Testing Colour-Appearance Models" Guidelines for Coordinated Research by Mark Fairchild, Aug. 1995. (One page).

(Continued)

*Primary Examiner* — Chan S Park
*Assistant Examiner* — Eueng-Nan Yeh
(74) *Attorney, Agent, or Firm* — Staas & Halsey LLP

(57) ABSTRACT

A color-reproduction system is provided. The system includes an image-content-analysis unit that analyzes the color distribution of pixels that constitute an inputted image, a parameter-prediction unit that predicts scaling parameters based on the attribute information on the pixels, the color distribution, and the image size information, and a luminance-chroma-determination unit that determines the final luminance and chroma of the pixels using the predicted parameters.

17 Claims, 9 Drawing Sheets

OTHER PUBLICATIONS

Testing Colour-Appearance Models Guidelines for Coordinated Research by Mark Fairchild, Aug. 1995. (Three Pages printed on May 4, 2011 from Internet).

Fairchild, Mark D., "Testing Colour-Appearance Models: Guidelines for Coordinated Research", pp. 1-18, Aug. 1995.

* cited by examiner

APPARATUS AND METHOD FOR COLOR REPRODUCTION

CROSS-REFERENCE TO RELATED APPLICATIONS

This application claims priority from Korean Patent Application No. 2006-0116566 filed on Nov. 23, 2006, in the Korean Intellectual Property Office, the disclosure of which is incorporated herein by reference in its entirety.

BACKGROUND OF THE INVENTION

1. Field of the Invention

Aspects of the present invention relate to color reproduction. More particularly, the present invention relates to a color-reproduction system and method that reproduces an image by changing various color attributes between display screens of different sizes.

2. Description of the Related Art

A wide variety display devices are being used in many aspects of our daily life. Recently, in addition to traditional CRT displays, mobile displays such as OLED and LCD mobile display devices are commonly used.

Especially, the mobile displays have developed dramatically and been widely applied in the mobile TV, mobile phone, PDAs, portable media players (PMPs) and others. The display industry has put many efforts to develop high quality displays having large color gamuts.

However, even if displays have a large color gamut, it's still not possible to faithfully reproduce color images due to device characteristics, viewing conditions and color shift in human perception.

Generally, the color generation for displays is different among different manufactures and even different models. The RGB color space generally employed for all displays does not take the color changes across different devices into account. In addition, the RGB color space does not take into account viewing conditions.

Consequently, the same image could appear significantly different on another display if employing gamut mapping in the RGB color space regardless of different device characteristics and different viewing conditions.

Therefore, in the conventional color reproduction method, color space conversion models have been employed to reproduce color imaging across different displays and viewing conditions.

For example, the GOG model and the PLCC model can be used to convert the image from device dependent RGB color values to device independent CIE (Commission Internationale de l'Eclairage) tristimulus values XYZ. According to CIE color appearance models, XYZ values can further be converted to three color appearance attributes, luminance, chroma and hue composition, which are independent of complicated viewing conditions.

However, although the device characteristics and viewing conditions issue can be resolved through the above color space conversion models, the color shift in human perception has not been considered in the above traditional color reproduction method.

Scientific instruments will record the true color of an image irrespective of whether the display panel extends over a small area or a large area, but the humans will perceive its colors as being different if the display size is altered.

Further, the color shifting for an image also depends on the image content. For example, the shifting effect would be significant for the images having a large area of uniform color, and would be slight for the images having a small area of uniform color.

Consequently, human perception of the image will change correspondingly when the image size is altered, which is called "image size effect on color shift in human perception" or "image size effect" for short. Hence, there is a need for a new accurate color reproduction method for compensating for the image-size effect.

International Unexamined Patent WO2004/097353A1 discloses a method for compensating for the shift in the human perception of color which occurs when the color is seen on a small surface area (e.g., those found in paint sales brochures or drapery catalogues) as compared with when it is seen extending over a large surface area (e.g., walls, ceilings or curtains). The above patent provides a method of calculating the shifts of the luminance and chroma values generated by color size effect in human perception. However, it cannot be applied to color reproduction between displays due to the following.

First, the prior patent is employed in the physical color rather than self-luminous color displays. It was found that chroma shift does not depend on hue for physical colors while it is different in the self-luminous color system.

Second, the size ratio was fixed in the prior patent, wherein the color reproduction is implemented from a subtending view angle in the range of 2-50°. While, the displays have a wide variety of size, for example, the subtending view angle can be 100, 150, 400, 900, 1000, and others. However, since the prior patent has not been designed for the uniform color patch, it does not take the image content into account. However, since the color images shown in the displays are not uniform in color, the image content needs to be considered.

SUMMARY OF THE INVENTION

Aspects of the present invention provide a color-reproduction system and method that can appropriately reproduce color from the perspective of a user even though the same image is reproduced in a display screen of different sizes.

According to an exemplary embodiment of the present invention, there is provided a color-reproduction system including an image-content-analysis unit that analyzes color distribution of pixels that constitute an inputted image, a parameter-prediction unit that predicts scaling parameters based on the attribute information on the pixels, the color distribution, and the image size information, and a luminance-chroma-determination unit that determines the final luminance and chroma of the pixels using the predicted parameters.

According to another exemplary embodiment of the present invention, there is provided a color-reproducing method including analyzing color distribution of pixels that constitute an inputted image, predicting scaling parameters based on the attribute information, the color distribution, and the image-size information of the pixels, and determining the final luminance and chroma of the pixels using the predicted parameters.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EXEMPLARY EMBODIMENTS

Figure 1:
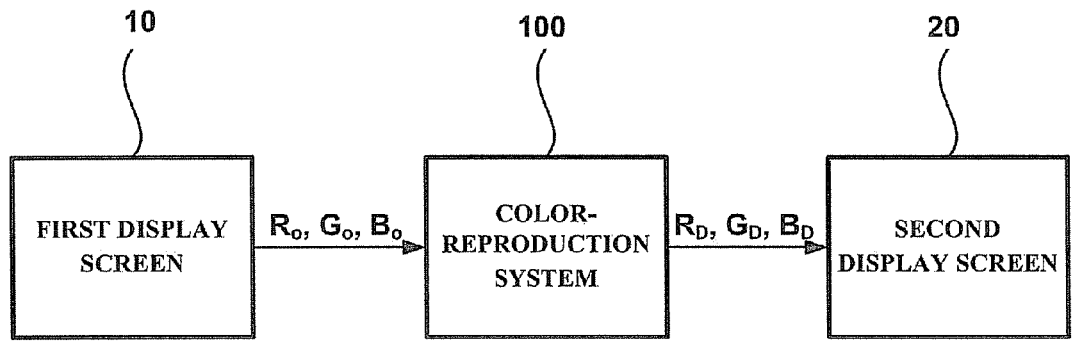
FIG. 1 is a schematic diagram illustrating color reproduction between two displays.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims.

Aspects of the present invention are described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded into a computer or other programmable data processing apparatus to cause a series of operations to be performed in the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order depending upon the functionality involved.

FIG. 1 shows a schematic diagram illustrating color reproduction between two displays.

Here, we assume the image in a first display 10 will be transferred into a second display 20 through a color reproduction system 100 according to an exemplary embodiment of the present invention. The $R_O$, $G_O$ and $B_O$ values of the image in the first display 10 will be converted into $R_D$, $G_D$, $B_D$ values to be output into the second display 20.

Figure 2:
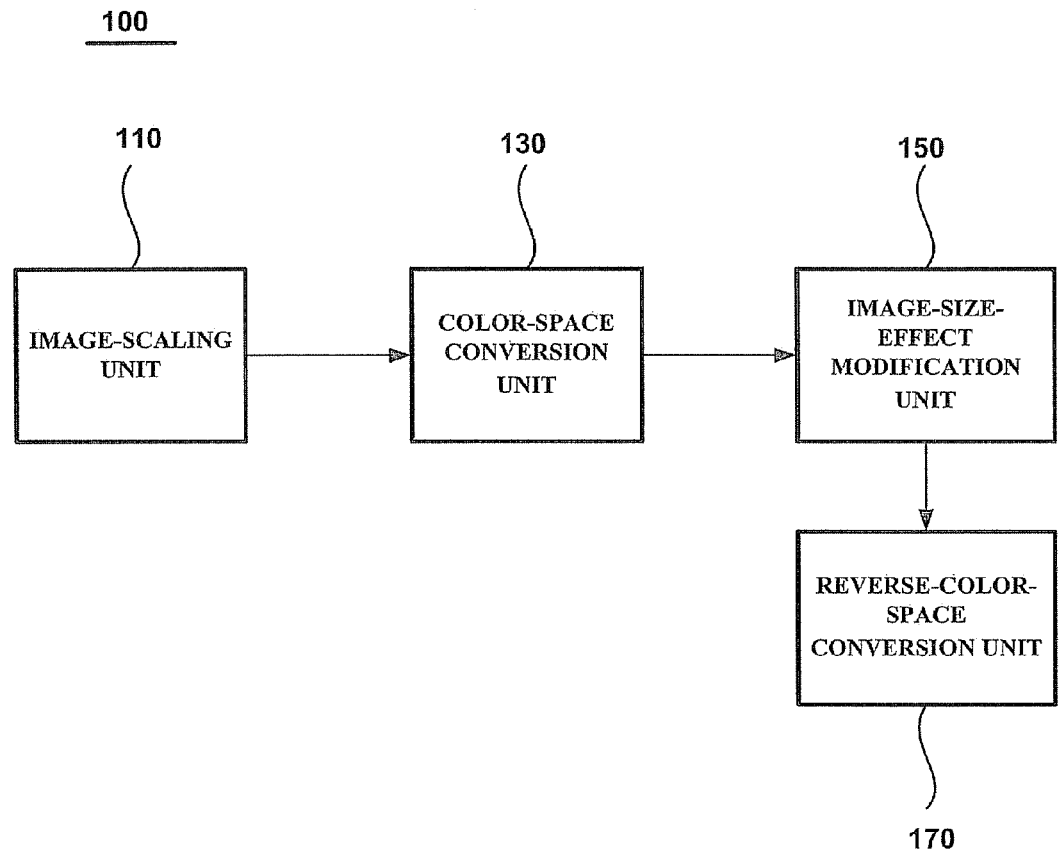
FIG. 2 is a block diagram illustrating a color-reproduction system for displays according to an exemplary embodiment of the present invention.
Figure 3:
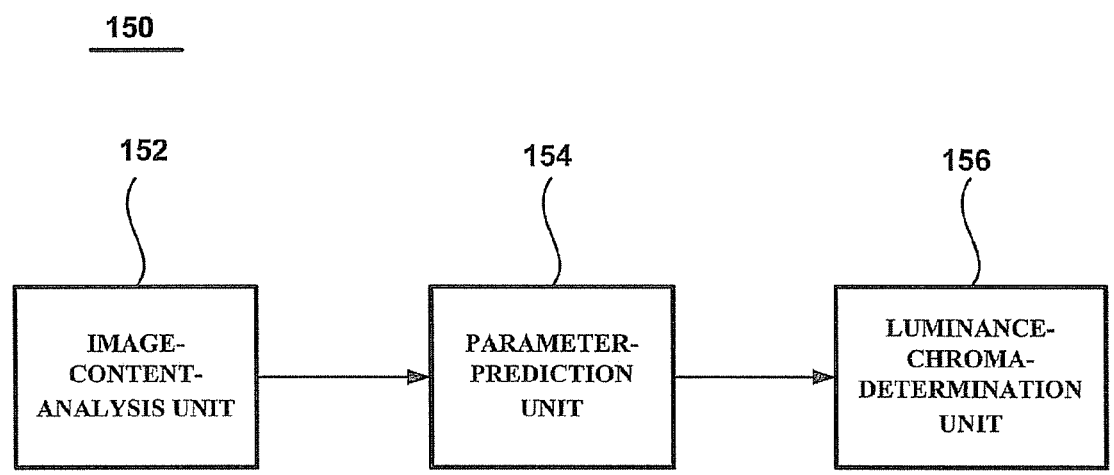
FIG. 3 is a block diagram illustrating the means of correcting the image-size effect in the system illustrated in FIG. 2.

FIG. 2 shows a block diagram illustrating a color-reproduction system for displays according to an exemplary embodiment of the present invention. The color reproduction system includes an image scaling unit 110, a color space conversion unit 130, an image-size-effect correction unit 150, and a reverse-color-space conversion unit 170. Further, FIG. 3 is a detailed block diagram illustrating the image-size effect correction unit 150, and the image size effect correction unit 150 includes an image-content-analysis unit 152, a parameter-prediction unit 154 that predicts scaling parameters such as $K_J$ and $K_C$, and a luminance-chroma-determination unit 156 that determines $J_D$ and $C_D$ corresponding to the final luminance value and the final chroma value, respectively.

Figure 4:
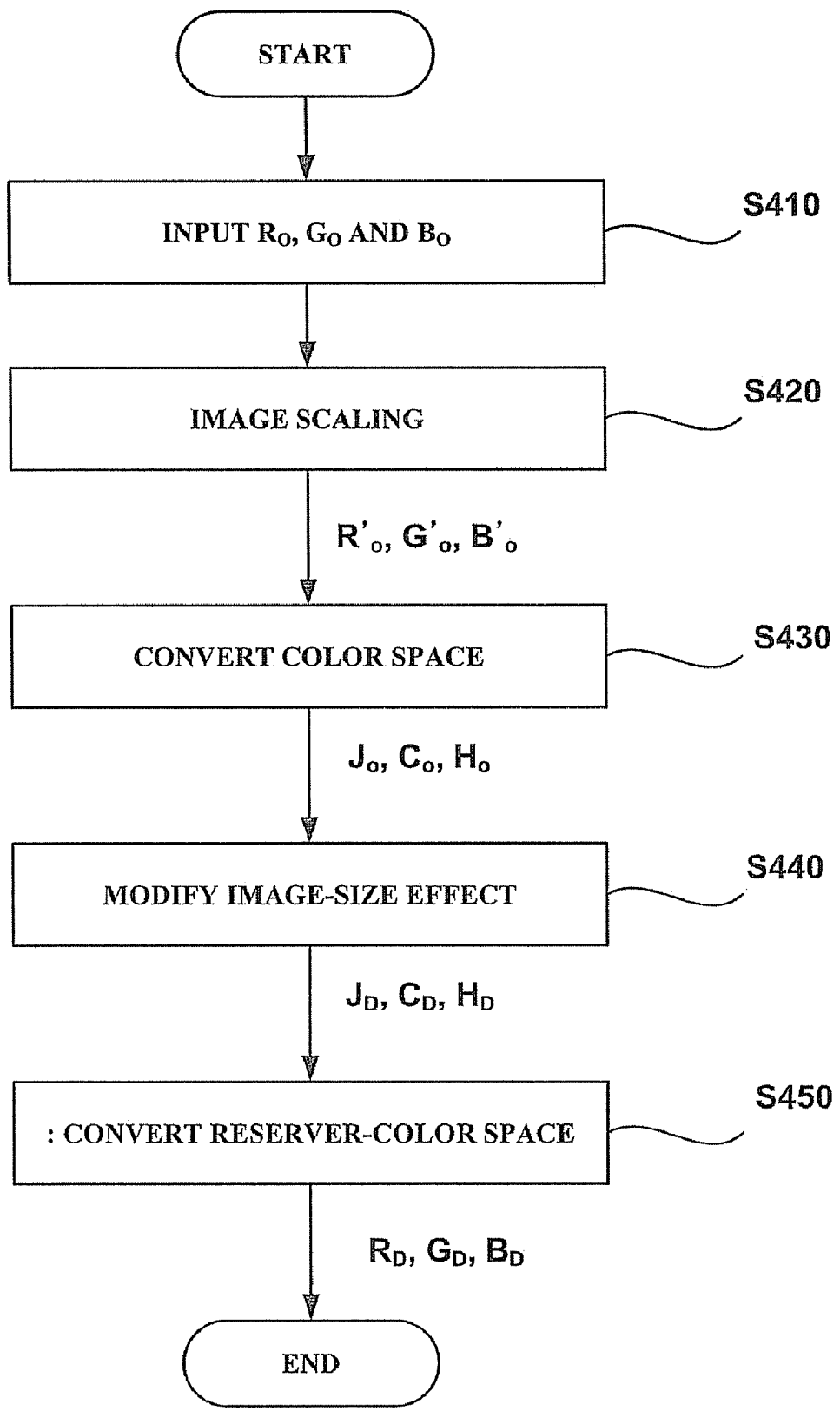
FIG. 4 is a flowchart illustrating a method of accurate color reproduction for displays according to an exemplary embodiment of the present invention.

FIG. 4 is a flowchart illustrating a method of color reproduction for displays according to an exemplary embodiment of the present invention. The operation of image-size effect correction S440 will be described in more detail with reference to FIG. 5.

Hereinafter, the color-reproduction system and method will be described with reference to FIGS. 2 to 5.

The image scaling unit 110 receives the input of the image color signals, that is, $R_O$, $G_O$ and $B_O$ values of each pixel of the image displayed in the first display S410.

Since the size of the first display is different from the size of second display, the resolutions of the first and second displays are different. Hence, image scaling must be conducted for the original RGB signals S420. There are several conventional methods widely used for image scaling, for example, near-neighbor scaling, bilinear interpolation and bicubic interpolation.

While the image scaling is performed, a sharpness enhancement can be applied to compensate for the lost details. Both image scaling and sharpness enhancement have been widely adopted and developed by display manufacturers, and the suitable image scaling method can be applied to fit the resolution of the second display of the present invention.

After the image scaling is performed, the original $R_O$, $G_O$ and $B_O$ values are converted into $R_O'$, $G_O'$ and $B_O'$ values, which will be input into the means for color-space conversion 130. Here, the conventional color space conversion method for compensating device characteristics and viewing conditions is implemented. That is, the $R_O'$, $G_O'$ and $B_O'$ values for each color pixel are converted into human-perceptual attributes independent of device characteristics and viewing conditions.

Specifically, the means for color-space conversion 130 will convert the device-dependent color values ($R_O'$, $G_O'$, $B_O'$) into device-independent CIE XYZ tristimulus values based on the device characteristics of the first display. For different displays, different methods can be employed. The two most common methods are the GOG model and the PLCC model. The former method is mainly used for devices having a linear or power gamma curve, such as CRT displays. The latter method can be used for devices having an irregular gamut curve, such as LCD or OLED mobile displays.

Then, the color space conversion unit 130 converts $X_O$, $Y_O$ and $Z_O$ values into human-perceptual attributes (color appearance attributes) which are irrespective of various viewing conditions such as the white point balance, luminance and surrounds. In 1997, the CIE suggested an interim color appearance model CIECAM97s, for predicting a corresponding color appearance to achieve color appearance attributes. In 2002, CIECAM02 was adopted by the CIE. This is a new revision of CIECAM97s, which improves its accuracy performance and simplifies the structure of the model. According to aspects of the present invention, CIECAM02 may be used to convert $X_O$, $Y_O$ and $Z_O$ values to $J_O$, $C_O$ and $H_O$ values. Here, J represents luminance, C represents chroma, and H represents hue composition. $J_O$, $C_O$ and $H_O$ stand for the J, C and H values of the image shown in the first display. However, if required, aspects of the present invention can be applied to any other uniform color space, such as CIELAB.

Hence, after operations S420 and S430 are performed, the original $R_O$, $G_O$ and $B_O$ signals are converted into $J_O$, $C_O$ and $H_O$ human-perceptual attributes for each pixel of the image.

For luminance and chroma attributes, the color correction needs to be performed to compensate the color shifting due to the image-size effect. However, the hue attribute is preserved because the hue attribute is not affected by image size. Hence, in operation S440, the image size effect on luminance and chroma attributes ($J_O$, $C_O$) is corrected.

Figure 5:
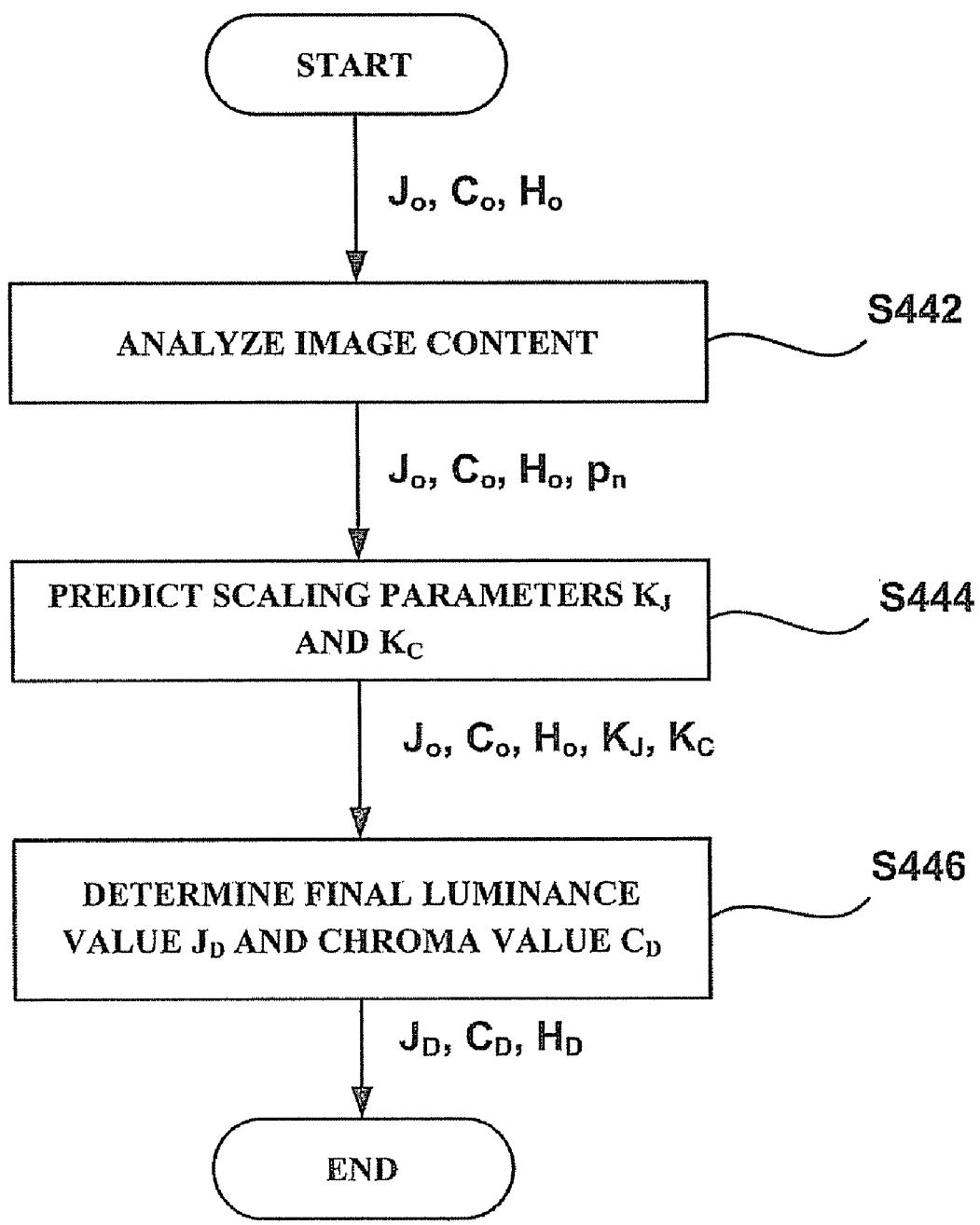
FIG. 5 is a flowchart illustrating correcting the image-size effect in the method illustrated in FIG. 4.

FIG. 5 is a detailed flowchart illustrating the correcting of the image size effect, which includes analyzing image content S442, predicting the scaling factors $K_J$ and $K_C$ for each hue range S444, and determining the destination luminance and chroma values $J_D$ and $C_D$ S446.

The image-content-analysis unit 152 analyzes the image content S442. Because an image with a relatively large uniform-color area such as blue sky and green grass has more significant image size effect than an image with a small uniform area, the color uniformity of an image, namely, image content, needs to be analyzed.

In order to verify whether the color area is uniform, only the hue difference is applied because it is not affected by image size effect.

Accordingly, in the CIECAM02 model, there will be four hue ranges, which are given in the following.

H1 (hue range 1): 0-100
H2 (hue range 2): 100-200
H3 (hue range 3): 200-300
H4 (hue range 4): 300-400

Here, numbers (0-400) corresponding to each hue range are mapped to arbitrary pixel values, and such mappings are presented in the CIECAM02 model, which can be found at: http://www.colour.org/tc8-01/.

Hence, in operation S442, the image content can be analyzed by calculating the percentages of pixels in each hue range. As such, there will be four percentages value $p_1$, $p_2$, $p_3$ and $p_4$ for hue ranges $H_1$, $H_2$, $H_3$ and $H_4$, respectively.

Figure 6:
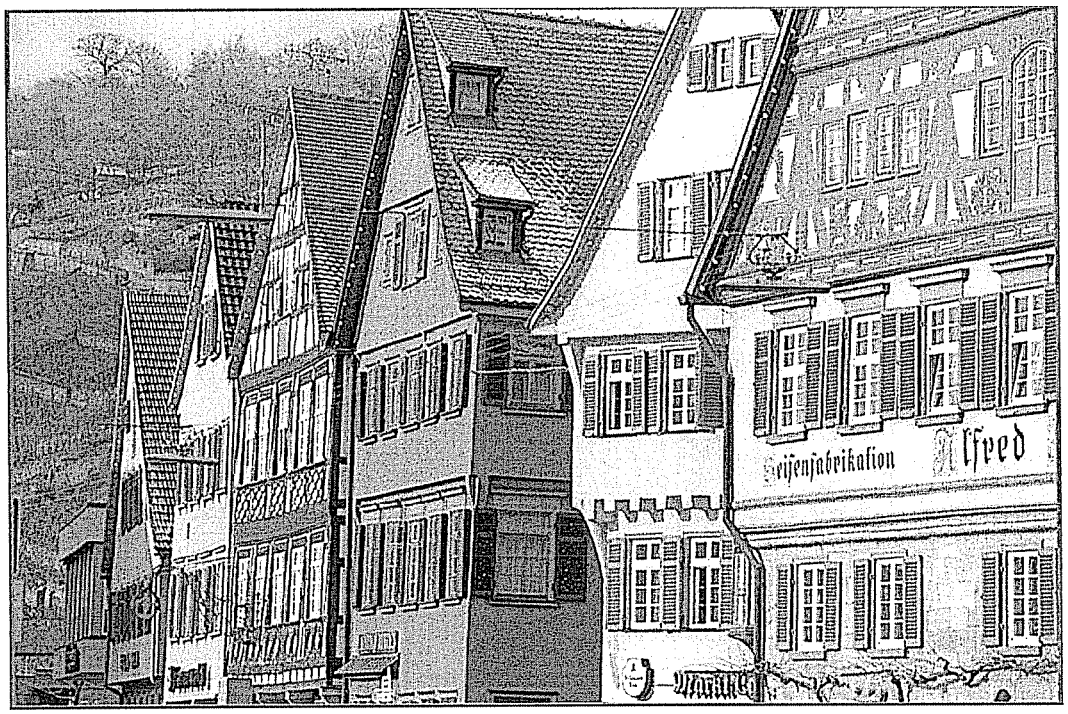
FIG. 6 illustrates a diagram of image-content-analysis results for a sample image.
Figure 6:
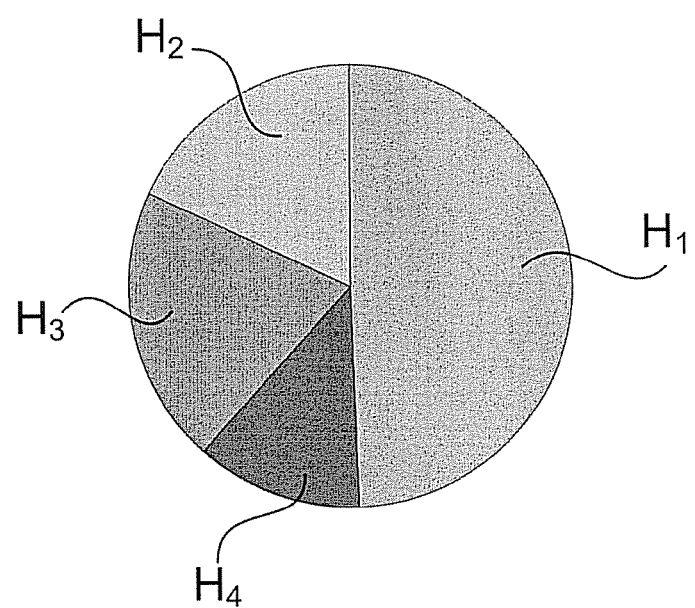

For example, FIG. 6 shows a percentage illustrating diagram of image-analysis results for a sample image. As illustrated in FIG. 6, the percentage values of the sample image for each hue range are:

H1 (0-100): $p_1$=49.5%
H2 (100-200): $p_2$=18.0%
H3 (200-300): $p_3$=20.2%
H4 (300-400): $p_4$=12.3%

Hence, after operation S442 is performed, each pixel of the image has four attributes: $J_O$, $C_O$, $H_O$ and $p_n$. Here, $p_n$ is the percentage value for the hue range that its hue value $H_O$ belongs to, and the values of the index "n" are 1, 2, 3 and 4 in the CIECAM02 model.

Further, in operation S444, the parameter-prediction unit 154 predicts the scaling parameter $K_J$ for the luminance attribute, and the scaling parameter $K_C$ for the chroma attribute based on percentage values for each hue range, original image size $S_O$ and destination image size $S_D$.

For identifying image-size effect, the subtending view angle is used rather than the absolute physical size of the image, because the viewing distance is an important factor that determines the image-size effect.

With changes of viewing distance, human perception will change correspondingly even though the physical image size is maintained.

Hence, the original image size $S_O$ and destination image size $S_D$ are the subtending view angles for the first display and the second display, respectively.

The definition of subtending view angle (Subtending_Angle) is given in equation 1:

$$\text{Subtending\_Angle} = ac\tan(\text{size}/\text{viewing\_distance}), \quad (1)$$

wherein the size can be the width, length or diameter of the display, and the viewing distance is the distance between the display and a human viewing the display.

For some common devices or media, the subtending angle is suggested by the display field (see Table 1).

TABLE 1

Recommend Subtending Angles for Different Size of Devices and Prints

| Device or Type of Print | Viewing Angle (degrees) | Device or Type of Print | Viewing Angle (degrees) |
|---|---|---|---|
| Mobile phones | 10 | Conventional TV | 40 |
| Mobile TVs PDAs, PMPs | 15 | HDTV | 30 |
| Computer Monitors (14-19 inch) | 30 | UDTV | 80 |
| Computer Monitors (>19 inch) | 50 | Cinema | 38 |
| Projectors (screen) | 50 | Print A4 | 30 |
| Projectors (wall) | 70 | Print (>A4) | 50 |

The scaling factors for luminance and chroma $K_J$ and $K_C$ will be predicted by equations 2 and 3 (The experiment A conducted to ascertain equations 2 and 3 will be described later):

$$K_J = \alpha_J \times \frac{S_O}{S_D}(p_n/25)^\theta + \beta_J \quad (2)$$

$$K_C = \alpha_C \times \frac{S_O}{S_D}(p_n/25)^\theta + \beta_C \quad (3)$$

wherein n=1, 2, 3 and 4, $p_n$ is the percentage value for each hue range, and $$\theta = 0.125 \times \frac{S_O}{S_D} - 0.125.$$

For luminance scaling factor $K_J$, $\alpha_J$, $\beta_J$ are independent of the hue range applied, $-0.026 < \alpha_J < -0.008$, $\alpha_J + \beta_J = 1$, and preferably $\alpha_J = -0.014$, $\beta_J = 1.014$.

For chroma scaling factor $K_C$, $\alpha_C, \beta_C$ are dependent of the applied hue range, and the range of $\alpha_C, \beta_C$ for each hue range is provided in Table 2, and the preferable $\alpha_C, \beta_C$ for each hue range is provided in Table 3.

TABLE 2

The Range of □ for Each Hue Range ($\alpha_c + \beta_c = 1$)

| | H1 (0-100) | H2 (100-200) | H3 (200-300) | H4 (300-400) |
|---|---|---|---|---|
| αc | | | | |
| Min | 0.005 | 0.008 | 0.011 | 0.013 |
| Max | 0.017 | 0.0175 | 0.021 | 0.025 |

TABLE 3

The Preferable □ and □ for Each Hue Range

| | H1 (0-100) | H2 (100-200) | H3 (200-300) | H4 (300-400) |
|---|---|---|---|---|
| αc | 0.0103 | 0.0127 | 0.0173 | 0.0192 |
| βc | 0.9897 | 0.9873 | 0.9837 | 0.9808 |

Hence, the scaling factors of luminance and chroma attributes $K_J$ and $K_C$ of each pixel can be calculated based on the hue range each pixel belongs to, original image size ($S_O$) and destination image size ($S_D$) through equations 2 and 3. After operation S444 is performed, each pixel of the image will have five attributes: $J_O$, $C_O$, $H_O$, $K_J$, and $K_C$.

The destination luminance and chroma values for each pixel will be determined by adjusting $J_O$, $C_O$ using $K_J$, $K_C$ S446, which is performed by the luminance-chroma determination unit 156.

Here, a linear function can be used for luminance adjustment as in equation 4. The line passes through coordinate (100,100) for reference white transformation:

$$J_D = 100 + K_J \times (J_O - 100) \quad (4)$$

Here, $J_D$ represents the destination luminance value.

Here, a linear function is used for chroma adjustment as in equation 5. The line passes through coordinate (0, 0) because the chroma of the neutral color is not changed by the size effect.

$$C_D = K_C \times C_O \quad (5)$$

Here, $C_D$ represents the destination chroma value.

After the image size effect correction is performed, the destination luminance and chroma values $J_D$ and $C_D$ for each image pixel are generated, and $H_D$ remains as the original $H_O$.

Then, the values ($J_D$, $C_D$ and $H_D$) of each pixel will be input into the means for reverse-color-space conversion 170.

The reverse color space conversion unit 170 transforms human perceptual attributes into RGB values S450.

The viewing conditions for the second display can be applied to the reverse CIECAM02 to transform human perceptual attributes to CIE XYZ tristimulus values.

The device characteristics of the second display 2 are applied to the reverse color space transformation model to transform CIE XYZ tristimulus values into $R_D$, $G_D$ and $B_D$ signals to be outputted to the second display device.

Finally, the psychophysical experiment can be used to evaluate the color-reproduction method and system according to aspects of the present invention.

The color images have been transformed from the first display to the second display through 4 color reproduction systems in the present experiment. Here, system 1 is a traditional color system without any correction to the luminance J and chroma C; system 2 is a color reproduction system with correction to the luminance J using KJ; system 3 is a color reproduction system with correction to the chroma C using Kc; and system 4 is a color reproduction system with correction to both luminance and chroma J, C using KJ and Kc, respectively.

The scaling parameters $K_J$ and $K_c$ are calculated in operation S444, in which $\alpha_J = -0.014$, $\beta_J = 1.014$, and $\alpha_{C-n}$, $\beta_{C-n}$ are the preferable values as shown in Table 3.

A LCD TV display with a 50° subtending viewing angle is used as the first display, and a mobile LCD display with a 10° subtending viewing angle is used as the second display. Several observers were asked to observe the original image shown in the first display and the destination images shown in the second display, in which 4 destination images were reproduced by the 4 color reproduction systems, and the observers evaluated the accuracy of reproduction level of the 4 destination images compared with the original image.

Further, the entire procedure was repeated on four test images. Finally, the accuracy evaluation data was summarized and processed using the pair comparison technology, and "A Law of Comparative Judgement" in "Psychological Review", which was suggested by L. L. Thurstone in 1927, are some of the examples of the technology.

Figure 7:
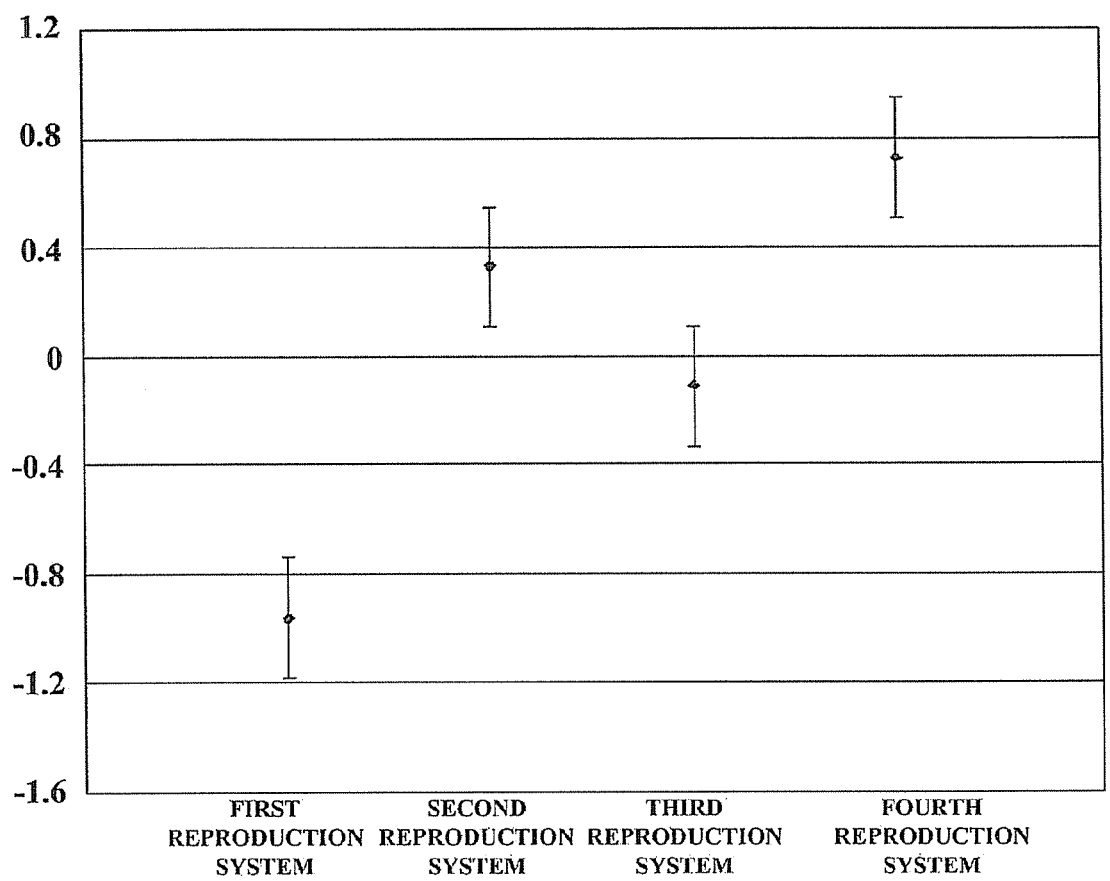
FIG. 7 illustrates the psychophysical experiment result based on the pair comparison technology according to an exemplary embodiment of the present invention.

FIG. 7 shows the experimental result based on the pair comparison technology, in which the longitudinal axis represents the accuracy level, and the four points in lateral axis represents 4 color reproduction systems, respectively.

Obviously, the system 4, the color reproduction system with correction to the luminance J and chroma C using $K_J$ and $K_c$ possesses the highest accuracy level. The accurate color reproduction system according to aspects of the present invention can improve the color reproduction quality between different size displays.

The supplementary description of experiment A of getting equations 2 and 3 is provided in the following.

First, the scaling parameters $K_J$ and $K_C$ for each uniform hue are predicted using the "Asymmetric matching" experiment, which is suggested by Fairchild M. D. in 1995 in "Testing Color-Appearance Models: Guidelines for Coordinated Research".

The color uniform self-luminous panels are divided into 4 groups with 4 hue ranges H1, H2, H3 and H4, and there are 6 pairs with different size rate R1, R2, R3, R4, R5 and R6 in each group, and therefore a total of 24 pairs of self-luminous samples are used in this experiment.

The CIE XYZ tristimulus values for the color of each panel can be measured using a scientific instrument. Then J, C and H can be calculated by CIECAM02 model under certain viewing conditions. For each pair of the panels, the luminance and chroma values ($J_O$ and $C_O$) and ($J_D$ and $C_D$) can be applied to equations 4 and 5, respectively, in order to get $K_J$ and $K_C$ values.

Here, $K_J$ and $K_C$ can be expressed as the following.

$$K_J = (J_D - 100)/(J_O - 100)$$

$$K_C = C_D/C_O$$

Figure 8A:
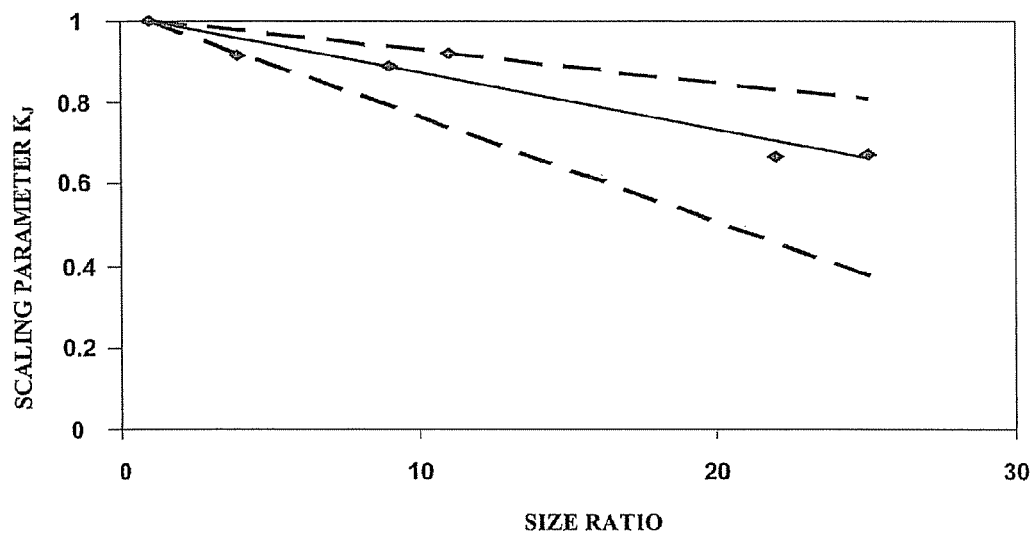
FIGS. 8A to 8E are graphs illustrating scaling parameters of the size ratio according to an exemplary embodiment of the present invention.
Figure 8B:
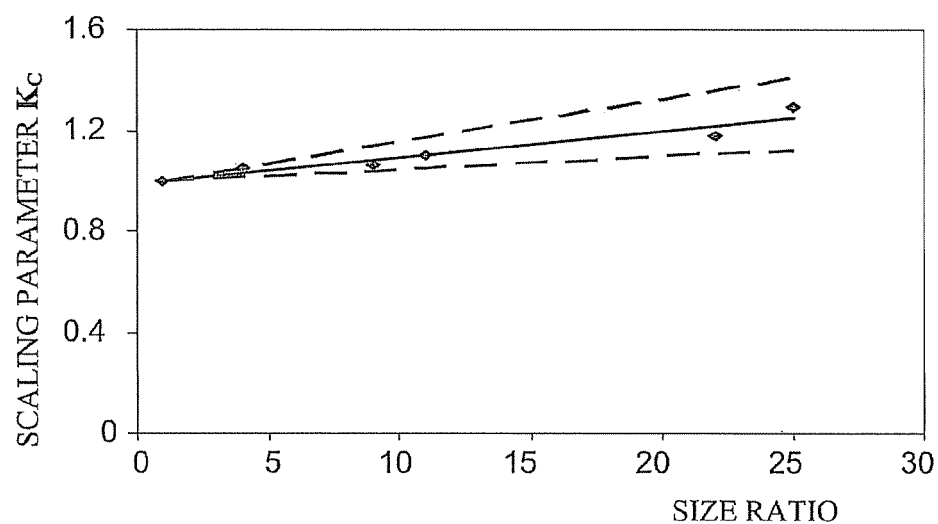
Figure 8C:
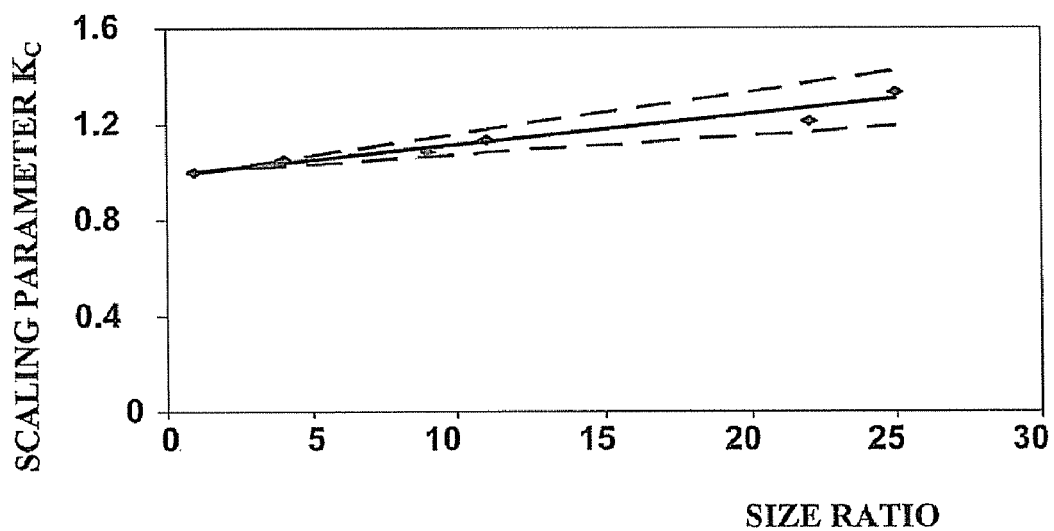
Figure 8D:
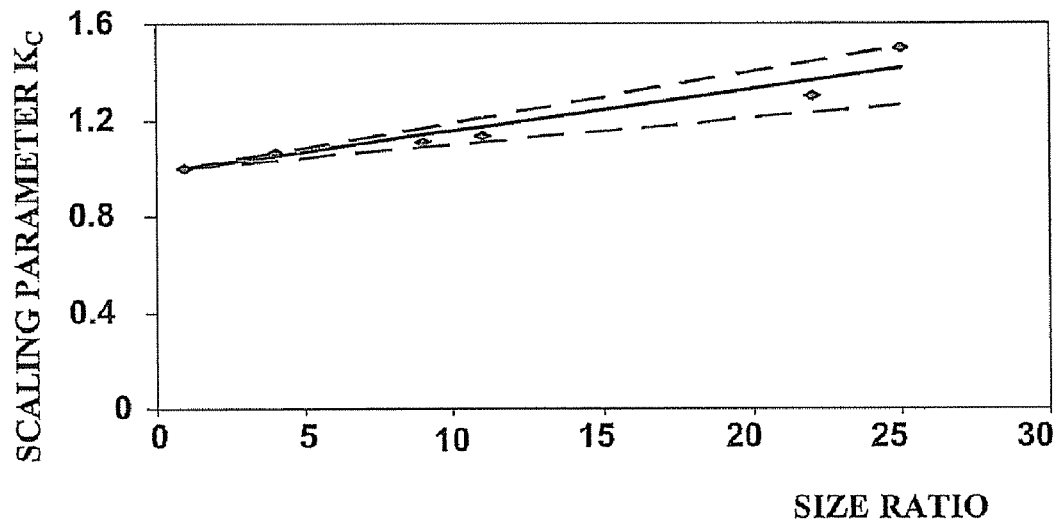
Figure 8E:
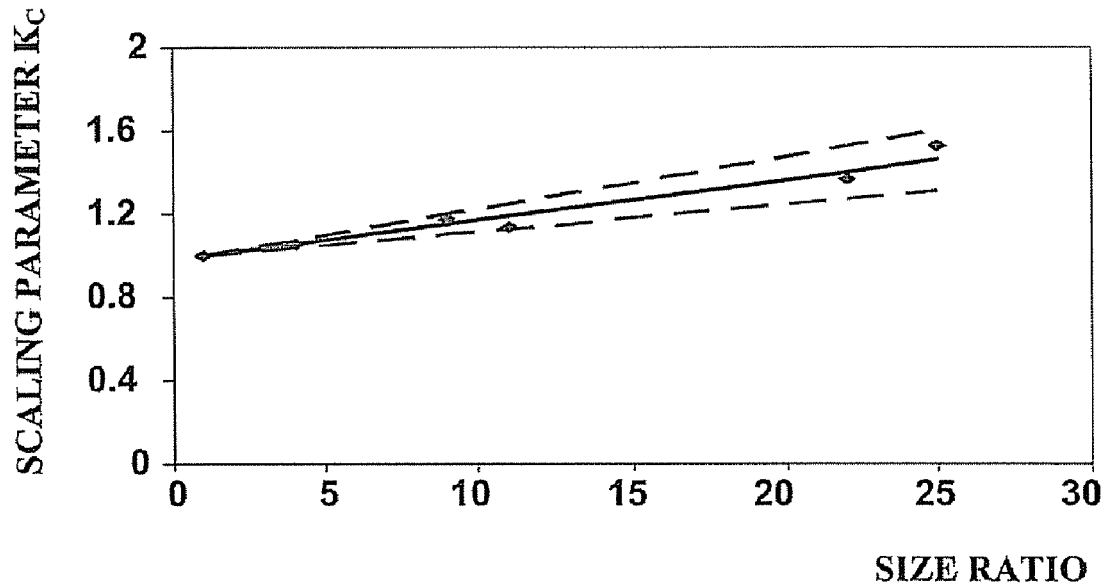

The $K_J$ scaling factors of luminance for each hue range group are very similar. FIG. 8A is a graph illustrating the relationship between size ratios for $K_J$ and one hue range. Based on FIG. 8A, the relation as in equation 6 can be acquired.

$$K_J = \alpha_J \times \frac{S_O}{S_D} + \beta_J \quad (6)$$

Here, $-0.026 < \alpha_J < -0.008$, $\alpha_J + \beta_J = 1$, and preferably $\alpha_J = -0.014$, $\beta_J = 1.014$ based on the curve expressed as a real line.

However, the KCU scaling parameters of chroma for each hue range group are different. FIGS. 8B to 8E are graphs illustrating the relationship between the size ratios on $K_C$ and the size ratio for each hue range, respectively. Based on FIGS. 8B to 8E, equation 7 can be acquired.

$$K_C = \alpha_C \times \frac{S_O}{S_D} + \beta_C \quad (7)$$

Here, the range and preferable values of $\alpha_C$ and $\beta_C$ are shown in tables 2 and 3 based on FIG. 8B to 8E.

Hence, the magnitude of luminance shift $K_J$ for each hue range is only affected by the changes of the image size, which is independent of the hue range applied. In contrast, the magnitude of chroma $K_C$ changes is different depending on the hue range. For example, the chroma change in H4 is much larger than that in H1.

The scaling parameters for luminance and chroma $K_J$ and $K_C$ in a uniform hue range panel can be predicted through the above equations. Further, because an image with a relative large uniform area would have a more significant size effect than the image with a small uniform area, the percentage values for each hue range need to be considered when predicting the scaling parameters $K_J$ and $K_C$ for an image with 4 hue ranges.

$K_J$ and $K_C$ for each hue range are modified by applying percentage values for each hue range to equations as in the following.

$$K_{J-n} = \alpha_J \times \frac{S_O}{S_D}(p_n/25)^\theta + \beta_J \quad (2)$$

$$K_{C-n} = \alpha_{C-n} \times \frac{S_O}{S_D}(p_n/25)^\theta + \beta_{C-n} \quad (3)$$

where n=1, 2, 3 and 4; pn is the percentage value for each hue range, and $$\theta = 0.125 \times \frac{S_O}{S_D} - 0.125.$$

The term "module", as used herein, means, but is not limited to, a software or hardware component, such as a Field Programmable Gate Array (FPGA) or an Application Specific Integrated Circuit (ASIC), which performs certain tasks. A module may advantageously be configured to reside in the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

It should be understood by those of ordinary skill in the art that various replacements, modifications and changes may be made in the form and details without departing from the spirit and scope of the present invention as defined by the following claims. Therefore, it is to be appreciated that the above described exemplary embodiments are for purposes of illustration only and are not to be construed as limitations of the invention.

According to aspects of the present invention, even though the same image is reproduced in a display screen of different sizes, the color is appropriately reproduced from the perspective of a user, which is advantageous.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A color-reproduction system adapted to transfer an original image in a first display to a destination image in a second display, the system comprising:
    a processor to control each of the following units;
    an image-content-analysis unit that analyzes color uniformity of an image content based on hue difference using at least one processor;
    a parameter-prediction unit that predicts luminance and chroma scaling parameters based on attribute information of the pixels, a color uniformity, and image size information; and
    a luminance-chroma-determination unit that determines a final luminance and chroma of the pixels using the predicted luminance and chroma scaling parameters,
    wherein the attribute information comprises luminance, chroma and hue information of the pixels; the color uniformity represents a percentage value for each pixel of the image for a hue range; and the image size information comprises a subtending viewing angle of the first display and the second display.

2. The system of claim 1, wherein the attribute information comprises color information independent of a device that displays the image.

3. The system of claim 1, wherein an image scaling unit receives the original image and is configured to scale the received image such that the inputted image is appropriate for a display screen in which the inputted image is displayed.

4. The system of claim 1, wherein the image-content-analysis unit analyzes the color uniformity by applying the CIECAM02 model.

5. The system of claim 1, wherein the luminance-chroma-determination unit determines the final luminance using a linear function.

6. The system of claim 5, wherein the linear function is expressed as $J_D = 100 + K_J \times (J_O - 100)$ $K_J$ is the predicted scaling parameter for the luminance modification, $J_O$ is a luminance element that constitutes the image, and $J_D$ is the modified final luminance.

7. The system of claim 1, wherein the luminance-chroma-determination unit determines the final chroma using a linear function.

8. The system of claim 7, wherein the linear function is expressed as $C_D=K_C \times C_O$, $K_c$ is the predicted scaling parameter for the chroma modification, $C_O$ is a chroma element of pixels that constitute the image, and $C_D$ is the modified final chroma.

9. A color-reproducing method for transferring an original image in a first display to a destination image in a second display, the method comprising:
   analyzing uniformity of an image content based on hue difference;
   predicting luminance and chroma scaling parameters based on attribute information, a color uniformity, and image-size information of the pixels; and
   determining a final luminance and chroma of the pixels using the predicted luminance and chroma scaling parameters,
   wherein the attribute information comprises luminance, chroma and hue information of the pixels; the color uniformity represents a percentage value for each pixel of the image for a hue range; and the image size information comprises a subtending viewing angle of the first display and the second display.

10. The method of claim 9, wherein the attribute information comprises color information independent of a device that displays the image.

11. The method of claim 9, wherein the image is scaled such that the image is appropriate for the second display in which the image is displayed.

12. The method of claim 9, wherein the analyzing comprises analyzing the color uniformity by applying the CIECAM02 model.

13. The method of claim 9, wherein the determining comprises determining the final luminance using a linear function.

14. The method of claim 13, wherein the linear function is expressed as $J_D=100+K_J \times (J_O-100)$, where $K_J$ is the predicted scaling parameter for the luminance modification, $J_O$ is a luminance element that constitutes the image, and $J_D$ is the modified final luminance.

15. The method of claim 9, wherein the determining determines the final chroma using a linear function.

16. The method of claim 15, wherein the linear function is expressed as $C_D=K_C \times C_O$, where $K_C$ is the predicted scaling parameter for the chroma modification, $C_O$ is a chroma element of pixels that constitute the image, and $C_D$ is the modified final chroma.

17. A non-transitory addressable storage medium storing computer program instructions that control at least one processor to implement the method of claim 9.

* * * * *

UNITED STATES PATENT AND TRADEMARK OFFICE
CERTIFICATE OF CORRECTION

PATENT NO.         : 8,411,936 B2                                      Page 1 of 1
APPLICATION NO.    : 11/873014
DATED              : April 2, 2013
INVENTOR(S)        : Kaida Xiao et al.

It is certified that error appears in the above-identified patent and that said Letters Patent is hereby corrected as shown below:

Title page Col. 2 under item (56), (Other Publications), Line 10, Delete "CIECAMO2"" and insert -- CIECAM02" --, therefor.

In the Claims:

Column 10, Line 67, In Claim 6, Delete "KJ" and insert -- , KJ --, therefor.

Signed and Sealed this
Eighteenth Day of March, 2014

Michelle K. Lee
*Deputy Director of the United States Patent and Trademark Office*